US007584066B2

(12) United States Patent
Roytelman

(10) Patent No.: US 7,584,066 B2
(45) Date of Patent: Sep. 1, 2009

(54) METHOD FOR DETERMINING POWER FLOW IN AN ELECTRICAL DISTRIBUTION SYSTEM

(75) Inventor: Ilya Roytelman, Plymouth, MN (US)

(73) Assignee: Siemens Energy, Inc., Orlando, FL (US)

( * ) Notice: Subject to any disclaimer, the term of this patent is extended or adjusted under 35 U.S.C. 154(b) by 83 days.

(21) Appl. No.: 11/701,110

(22) Filed: Feb. 1, 2007

(65) Prior Publication Data

US 2007/0185665 A1 Aug. 9, 2007

Related U.S. Application Data

(60) Provisional application No. 60/764,203, filed on Feb. 1, 2006.

(51) Int. Cl.
*G01R 21/00* (2006.01)
*G06F 11/30* (2006.01)
(52) U.S. Cl. .................. 702/60; 702/64; 702/65; 702/182; 703/18

(58) Field of Classification Search ............. 702/60–65, 702/104–107, 189, 181–188, 58, 81; 703/18, 703/2, 13, 14; 700/286, 291, 295, 297, 298; 361/42, 47, 62, 65, 94, 95
See application file for complete search history.

(56) References Cited

U.S. PATENT DOCUMENTS

2004/0243377 A1* 12/2004 Roytelman .................. 703/18

* cited by examiner

*Primary Examiner*—Eliseo Ramos Feliciano
*Assistant Examiner*—Phuong Huynh

(57) ABSTRACT

A method for determining a power flow in an electrical distribution network (104) includes determining respective feeder apparent powers of electrical power feeders (114) connected at a supply node (118) of the electrical distribution network. The method also includes determining a feeder power factor angle of at least one of the feeders responsive to the feeder apparent powers, a supply node active power, and a supply node reactive power. The method then includes using at least one of the feeder power factor angles for determining a power flow in the electrical distribution network, such as by calculating feeder active and reactive power and using these powers to provide load allocation.

19 Claims, 2 Drawing Sheets

METHOD FOR DETERMINING POWER FLOW IN AN ELECTRICAL DISTRIBUTION SYSTEM

This application claims the benefit of U.S. Provisional Patent Application No. 60/764,203, filed Feb. 1, 2006, which is incorporated herein by reference.

FIELD OF THE INVENTION

The present invention relates generally to methods of determining power flow in electrical distribution systems, and more particularly, to methods of providing power flow measurements useful for load scaling.

BACKGROUND OF THE INVENTION

Modeling the behavior of an electrical power network is important for ensuring reliable electrical service. The electrical power network consists of many interconnected elements, including power generation nodes, transmission systems, distribution systems and loads. Electrical power generators and distribution entities cooperate to achieve delivery of power upon demand. For example, electrical power generation and distribution entities may cooperate to facilitate to transmission of power from Arizona to a high need area in New York City at certain times of day or year, and to facilitate transmission of power from New York State to Arizona at other times of day or year.

In general, the electrical power network can be divided into two main elements, transmission systems and distribution systems. Transmission systems include transmission lines that deliver energy from power generating devices to power substations. Distribution systems are networks that distribute power from the power substations to the individual end-user loads. Distribution systems may also transfer power among themselves.

Transmission systems employ very high voltages, typically on the order of 110 kV to 500 kV AC, and have an interstate extent. Transmission systems transmit power in three phases, and tend to have balanced loads on all three phases. By contrast, distribution systems tend to employ lower distribution voltages (under 66 kV), and typically cover a confined geographical service such as a metropolitan area and its surrounds. While distribution systems are also three phase systems, the loads in distribution systems can be unbalanced due to the presence of two phase and single phase lines and distribution transformers.

Real-time modeling of transmission systems has been used to assist in the efficient allocation of power between power generators and the distribution substations. Real-time models may be generated multiple times per day to determine whether a reallocation in power is required. In the modeling of transmission systems, the distribution systems (i.e. represented by power substations and connected loads) are treated as balanced loads, and thus have composite electrical characteristics that are relatively easy to represent. Moreover, real-time power usage information at the subsystem level is readily available.

Modeling has also been used in distribution systems. However, for several reasons, modeling in distribution systems has typically been limited to non-real time or offline modeling. In particular, unlike transmission systems, real-time power flow measurements at individual loads are not readily available in distribution systems. While the usage of power at individual loads is typically metered (i.e. using electricity meters), the metered power information is typically not available in real time. More specifically, power measurement information from customer electricity meters is usually only retrieved at long intervals, for example, monthly. The lack of real-time power measurement information for the individual loads significantly complicates the development of real-time power flows in distribution systems.

Offline power flows, by contrast, do not require real-time measurement information. Instead, offline power flows employ assumptions about individual loads that suit the problem being addressed. For example, one offline power flow technique assumes full loading of all elements of the distribution network. Such a power flow may be used to identify areas of the distribution network in which increased capacity may be required to ensure proper operation during peak loading times.

Offline power flows, however, have limited usefulness in determining real time resource allocation. Resource allocation in distribution systems is dynamic, and is preferably updated several times per day. Thus, if power flow information is to be used in dynamic resource allocation, then power flows that use real-time power measurements are more desirable than offline power flows.

To satisfy this need, techniques have been developed that generate a real-time power flow in a distribution system using the limited real time power measurements that are available. However, because real-time power consumption information may not be available at all points throughout an electrical distribution network, historical usage information regarding individual loads of a distribution network may be used to estimate power usage based on available real-time power consumption information. For example, real-time power consumption information may be available at different locations on feeder lines, which at least provides some detail as to the power consumption of the distribution system. The historical consumption statistics of various loads connected to the feeders is then used to extrapolate out the measured power consumption to each of the various loads.

For example, consider a situation in which there are three loads on a feeder line, and that real-time measurement information is available for the feeder head. Also consider that two of the loads have roughly the same historical energy consumption record, and that the other load has twice the energy consumption of each of the first two loads. In such a case, the real-time measured energy of the feeder may be allocated at a ratio of 1:1:2. For example, if the real-time measured power on the feeder is 12 kW, it can be assumed that the first two loads are each consuming 3 kW and the third load is consuming 6 kW. This method of allocation in determining real-time power flow is known as scaling. Scaling factors are typically used to allocate measured power consumption at a supply node to individual loads connected to the node.

BRIEF DESCRIPTION OF THE DRAWINGS

The invention is explained in the following description in view of the drawings that show.

DETAILED DESCRIPTION OF THE INVENTION

Figure 1:
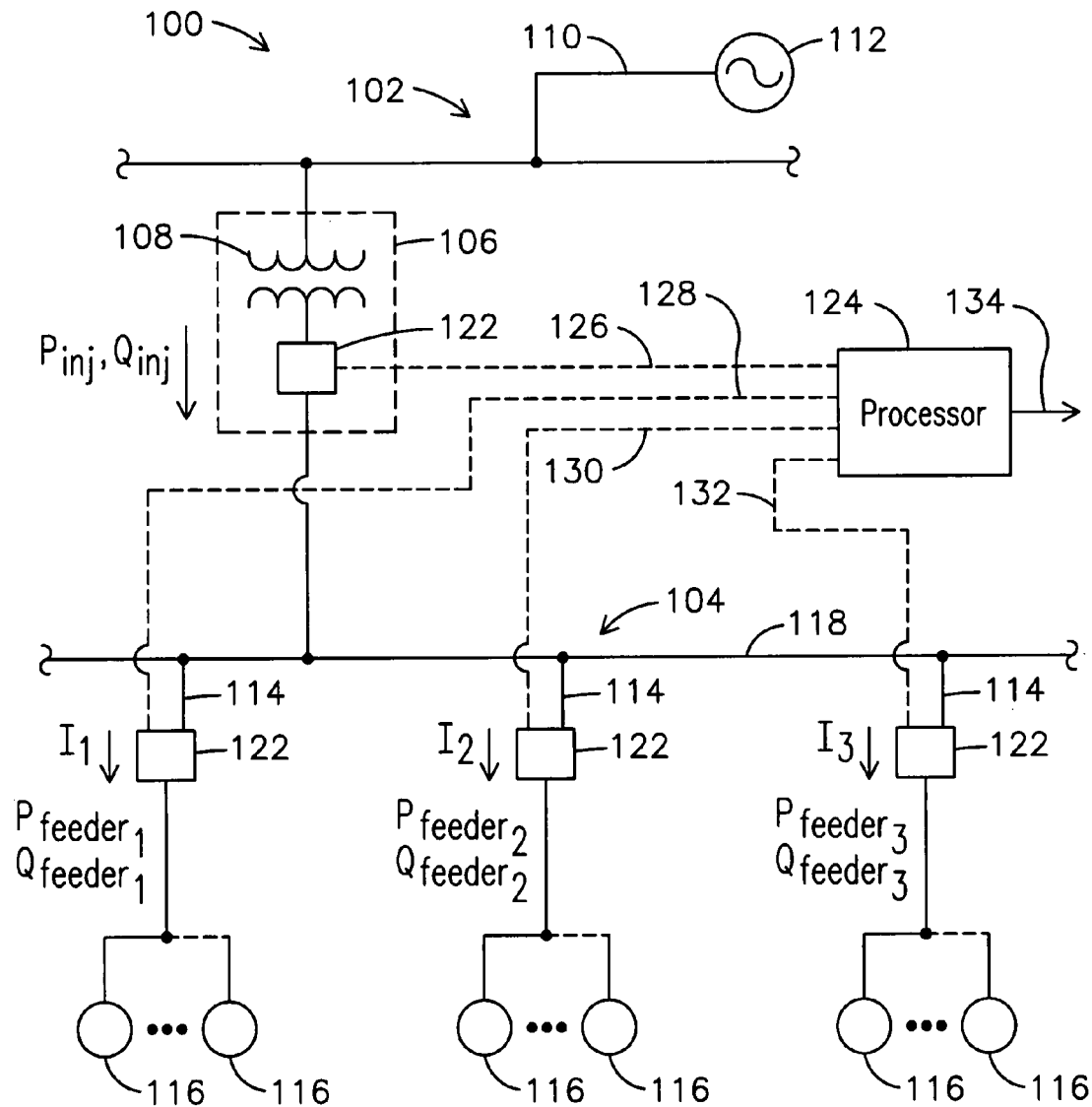
FIG. 1 is a schematic representation of a portion of an exemplary electrical power network for which load scaling using current and power measurements may be accomplished in accordance with the present invention.

FIG. 1 shows a schematic representation of a portion of an electrical power network 100 to which aspects of the present invention may be applied. The network 100 includes a transmission network 102, a distribution network 104, and at least one substation 106 in between the transmission network 102 and the distribution network 104. The transmission network 102 includes high voltage transmission lines 110 and at least one three phase power generator 112. Substation 106 connects to the transmission line 110 and may include one or more transformers 108, such as a three phase transformer. Such transformer types, and their variants, are well known in the art. The distribution network 104 may include a number of feeders 114 emanating from the power substation 106 providing electrical power to one or more respective loads 116. Power measurement devices 122 may disposed at various points throughout distribution network 104 to measure power and/or current flow. By way of example, the power measurement devices 122 may be connected to a Supervisory Control and Data Acquisition ("SCADA") system, which is known in the art.

In operation, generator 112 generates power for transmission over the transmission line 110 at high voltage, for example 110 kV. The power substation 106 converts the voltage to a lower level, for example, 20 kV, for propagation over the feeders 114 to loads 116. The transmission network 102 and distribution network 104 deliver energy in three phases, typically referred to as phase A, phase B and phase C. Each of the phases has a similar voltage magnitude, but has a different phase angle with respect to the other phases.

A power flow through the network 100, as is known in the art, is a collection of values representative of a relatively detailed model of voltage, current and/or power flow values within an electrical power system. A real-time power flow is a power flow using real-time measured values to formulate the power flow. The real-time measured values may consist of voltages, active and reactive power, and/or current measurement value obtained at various points of the system, such as at the measurement devices 122. For example, typical network power system measurements may include measurements of currents I1, I2, and I3 taken at the heads of feeders 114 by measurement devices 122. Such measurements are typically needed to ensure that feeder conductors are not current overloaded. In addition, because transformer overload limits are typically defined by apparent power provided at the transformer, measurements of injected power Pinj, Qinj, are typically taken, for example, by devices mounted on a circuit breaker associated with the substation transformer 108. Accordingly, in a typical substation, measurement devices 122 configured for measuring current are used on feeders 114, and measurement deices 122 configured for measuring injected power Pinj, Qinj are used on circuit breakers of substation transformer 108.

Through the use of load scaling, it is possible to calculate a real-time power flow (details of power usage at each load 116) for a distribution network 100 having limited real-time measurement data on power consumption. For example, respective load scaling factors for allocating loads among feeders to determine power flow may be calculated according to the equations (1) and (2):

$$SFP_i = \frac{P_{meas} - P_{calc}}{\Sigma P_i \text{ for } i = 1 \text{ to } M}; \quad (1)$$

$$SFQ_i = \frac{Q_{meas} - Q_{calc}}{\Sigma Q_i \text{ for } i = 1 \text{ to } M}. \quad (2)$$

In equation (1), $SFP_i$ is the scaling factor for active power at feeder i, $P_{meas}$ is a measured active power for the substation, $P_{calc}$ is a calculated active power for the substation, and $\Sigma P_i$ is the sum of the active powers at each feeder of the substation. In equation (2), $SFQ_i$ is the scaling factor for reactive power at feeder i, $Q_{meas}$ is a measured reactive power for the substation, $Q_{calc}$ is a calculated reactive power for the substation, and $\Sigma Q_i$ is the sum of the reactive powers at each feeder of the substation. Such load scaling may typically include changing a calculated active power P and calculated reactive power Q of the load(s) 116 to make these values equal to corresponding measured values. For example, in the case of the network 100 shown in FIG. 1, it is desired to make each calculated current I1(calc), I2(calc), and I3(calc) at each feeder 114 equal to the corresponding measured currents I1(meas), I2(meas), and I3(meas), while keeping calculated injected power Pinj(calc) and Qinj(calc) to equal to Pinj(meas) and Qinj(meas). Accordingly, a solution that simultaneously solves for P, Q, and I, is desired to provide improved generation of load scaling factors to more accurately estimate real time power flow, for example, among feeders 114 of a distribution network 100. However, it is believed that conventional load scaling calculations are limited in accuracy because such solutions use only magnitudes of a measured current I. Without knowledge of the current angle, i.e. power factor angle, information, Pload and Qload of downstream loads cannot be accurately calculated to provide an estimate of real time power flow to enable determination of appropriate scale factors for the supply nodes.

The inventor of the present invention has developed an innovative load scaling method for a plurality of network feeders that provides a calculated feeder current Icalc equal to a measured feeder current Imeas, and simultaneously provides calculated injected power Pinj(calc) and Qinj(calc) equal to measured power Pinj(meas) and Qinj(meas). Accordingly, more accurate scaling factors can be determined using the calculated and measured values to produce an improved estimation of real-time power flow in the network 100.

In an example embodiment, the method includes determining an apparent power S for each measured current Imeas of at least two power network feeders. Apparent power S may be calculated from Imeas using equation (3): as:

$$S = \sqrt{3} V I_{meas} \quad (3)$$

Voltage V may be measured, for example at a feeder head busbar 120, or may be estimated based on a nominal voltage at a substation 106. Typically, voltage V is very close to a nominal voltage because substation transformers 108 are equipped with a Load Tap Changer (LTC). The LTC is a known type of local controller that keeps voltage at the busbar 120 equal to the desired value by changing transformer tap positions.

The method then includes determining the respective power factor angles φ of the feeder currents/responsive to the respective determined apparent power S and the active power Pinj and reactive power Qinj injected at the substation. For example, a system of equations (4) may be established for the substation node 118 using Kirchoff's first law and the know relationships that active power P is equal to apparent power times cosine of the power factor angle, P=S cos φ, and reactive power Q is equal to apparent power times sine of the power factor angle, P=S sin φ. Accordingly, the system of equations (4) defines each feeder's apparent power S with respect to injected power P and Q.

$$P_{inj} = S_1 \cos \phi_1 + S_2 \cos \phi_2 + S_3 \cos \phi_3 + \ldots + S_n \cos \phi_n$$

$$Q_{inj} = S_1 \sin \phi_1 + S_2 \sin \phi_2 + S_3 \sin \phi_3 + \ldots + S_n \sin \phi_n \quad (4)$$

The system of two equations (4) includes n unknown variables, $\phi_1, \phi_2, \phi_3, \ldots, \phi_n$, where n is a number of feeders, and $\phi_n$ is the power factor angle for feeder n. Upon solving the set of equation (2) for $\phi_1, \phi_2, \ldots, \phi_n$, the active and reactive powers for each feeder may be calculated as $P_{feeder} = S \cos \phi$, $Q_{feeder} = S \sin \phi$. By scaling the feeder loads according to the calculated $P_{feeder}$, $Q_{feeder}$ for each feeder, for example, using equations (1) and (2), the calculated values will be made equal to the measured values with regard to feeder currents I and injected power P, Q.

Figure 2:
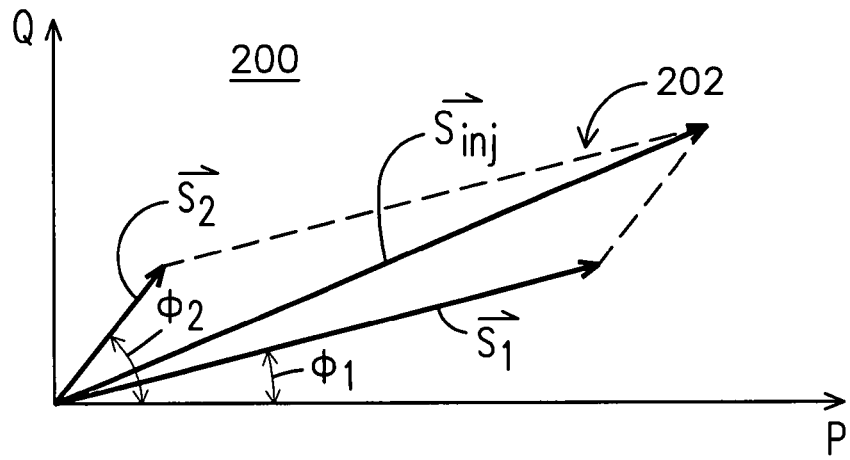
FIG. 2 is a vector diagram for an exemplary two feeder scaling solution.

The power factor angles $\phi_1, \phi_2, \ldots, \phi_n$ in the system of equations (4) may be calculated using a variety of techniques. For example, the case of n=1 is trivial. The case of n=2, i.e., there are two feeders connected to the substation, can be solved using known analytical techniques for two equations having two unknowns $\phi_1, \phi_2$. Accordingly, for n=2, the system reduces to the set of equations (5) below:

$$\sin(\phi_1 + \alpha) = (P_{inj}^2 + Q_{inj}^2 + S_1^2 - S_2^2)/(2S_1 \sqrt{P_{inj}^2 + Q_{inj}^2})$$

$$\sin(\phi_2 + \alpha) = (P_{inj}^2 + Q_{inj}^2 + S_2^2 - S_1^2)/(2S_2 \sqrt{P_{inj}^2 + Q_{inj}^2}) \quad (5)$$

where $\alpha = \arccos(Q_{inj}/\sqrt{P_{inj}^2 + Q_{inj}^2})$ which can be solved directly. A graphical illustration of the vector diagram 200 where n=2 is depicted in FIG. 2. Three vectors, apparent injected power $\vec{S}$ inj and respective feeder apparent powers $\vec{S}1$, $\vec{S}2$ create a vector solution 202, which can be built under a condition such that the magnitude of $\vec{S}$ inj is less than the magnitude sum of $\vec{S}1, \vec{S}2$.

Figure 3:
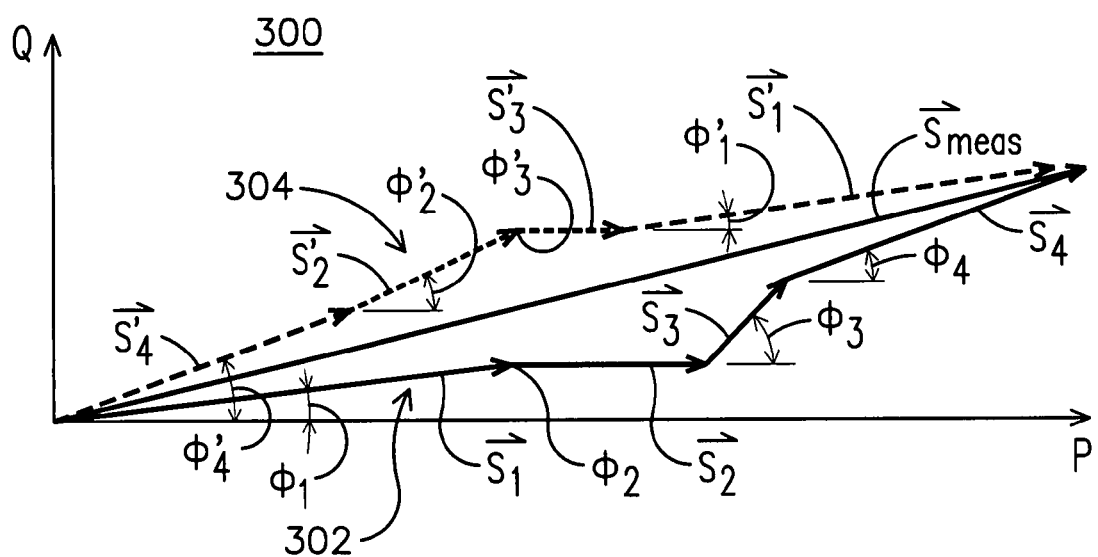
FIG. 3 is a vector diagram for an exemplary four feeder scaling solution.

When a number of feeders n is greater than 2, the system of equations (4) includes more variables than equations. Consequently, there is more than one combination of angles $\phi_1, \phi_2, \phi_3, \ldots, \phi_n$ that satisfies the system of equations (4). This is illustrated in the vector diagram 300 of FIG. 3 for four feeders, i.e. n=4. Each of the solutions 302, 304 will satisfy respective feeder current magnitudes I1 . . . In, for example derived based on S1 . . . Sn or S1' . . . Sn' and injected power values Pinj and Qinj.

In the case of more than two feeders, power factor angles may be solved using iterative techniques, such as an iterative procedure built on equations (5). For example, for each feeder k of a set of n feeders and having a power factor angle $\phi_k$ as a variable, all other feeders of the set can be combined together to represent a second feeder. By reducing n to 2, analytic techniques can be used to calculate $\phi_k$ using equations (5). The calculated value of $\phi_k$ can then be used to calculate other power factor angles of other feeders by iteratively using the second feeder representation technique described above. In addition, because of multiple possible solutions for n>2, additional conditions may be imposed on feeder power factors which may provide a more desirable or feasible solution. For example, feeder power factors that require minimal change in the load power factors for all loads scaled according to feeder P's and Q's may be used.

A processor 124 may be configured for implementing steps for performing the above described method. Processor 124 may take any form known in the art, for example, an analog or digital microprocessor or computer, and it may be integrated into or combined with one or more processors used for other functions related to power flow monitoring of the network 100, such as an existing SCADA processor. The steps necessary for performing the method may be embodied in hardware, software and/or firmware in any form that is accessible and executable by processor 124 and may be stored on any medium that is convenient for the particular application. The processor 124 may receive input signals 126, 128, 130, 132 from the measurement devices 122 and process the signals according the above method to generate an output 134, such as one or more power factor angles and/or active and reactive power of the feeders.

Based on the foregoing specification, the exemplary methods described for determining power flow in an electrical distribution network may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc. The article of manufacture containing the computer code may be made and/or used by executing the code by the processor. In an example application, the computer readable media may be used for upgrading an existing SCADA device.

One skilled in the art of computer science will easily be able to combine the software created as described with appropriate general purpose or special purpose computer hardware, such as a microprocessor, to create a computer system or computer sub-system embodying the method of the invention. An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method for determining a power flow in an electrical distribution network comprising:
   determining respective feeder apparent powers of a plurality of electrical distribution network feeders receiving electrical power from a supply node of an electrical distribution network responsive to respective feeder currents in the feeders and a node voltage of the supply node;
   generating a system of node equations having feeder power factor angles of each of the feeders as variables and relating the feeder apparent powers with respect to a supply node active power, and a supply node reactive power, wherein the system of node equations is defined as follows:

$$P_{inj} = S_1 \cos \phi_1 + S_2 \cos \phi_2 + S_3 \cos \phi_3 + \ldots + S_n \cos \phi_n,$$

$$Q_{inj} = S_1 \sin \phi_1 + S_2 \sin \phi_2 + S_3 \sin \phi_3 + \ldots + S_n \sin \phi_n$$

wherein n is a positive integer that represents a number of feeders, $\phi_n$ represents a power factor angle for an $n^{th}$ feeder, $S_n$ represents apparent power for the $n^{th}$ feeder with respect to injected active power $P_{inj}$ and injected reactive power $Q_{inj}$;

solving the system of node equations for at least one of the feeder power factor angles; and using the feeder power factor angle for determining a power flow in the electrical distribution network.

2. The method of claim 1, further comprising calculating at least one of a feeder active power and a feeder reactive power responsive to a corresponding feeder apparent power and a corresponding feeder power factor angle.

3. The method of claim 2, further comprising generating a load scaling factor responsive to at least one of the feeder active powers and the feeder reactive powers.

4. The method of claim 3, further comprising using the load scaling factor to determine a load allocation among the feeders.

5. The method of claim 1, wherein solving the system of node equations comprises using an iterative technique.

6. A method for determining a power flow in an electrical distribution network comprising:

determining respective feeder apparent powers of electrical power feeders connected at a supply node of an electrical distribution network;

relating the feeder apparent powers with respect to a supply node active power and a supply node reactive power, wherein the relating is defined by the following system of equations:

$$P_{inj} = S_1 \cos \phi_1 + S_2 \cos \phi_2 + S_3 \cos \phi_3 + \ldots + S_n \cos \phi_n$$

$$Q_{inj} = S_1 \sin \phi_1 + S_2 \sin \phi_2 + S_3 \sin \phi_3 + \ldots + S_n \sin \phi_n,$$

wherein n is a positive integer that represents a number of feeders, $\phi_n$ represents a power factor angle for an $n^{th}$ feeder, $S_n$ represents apparent power for the $n^{th}$ feeder with respect to injected active power $P_{inj}$ and injected reactive power $Q_{inj}$;

determining a feeder power factor angle of at least one of the feeders responsive to the feeder apparent powers, the supply node active power, and the supply node reactive power; and using at least one of the feeder power factor angles for determining a power flow in the electrical distribution network.

7. The method of claim 6, wherein determining a feeder power factor angle comprises generating a system of node equations having feeder power factor angles of each of the feeders as variables and relating feeder apparent powers, a supply node active power, and a supply node reactive power.

8. The method of claim 7, further comprising solving the system of node equations for at least one of the feeder power factor angles.

9. The method of claim 8, wherein solving the system of node equations comprises using an iterative technique.

10. The method of claim 6, further comprising calculating at least one of a feeder active power and a feeder reactive power responsive to a corresponding feeder apparent power and a corresponding feeder power factor angle.

11. The method of claim 10, further comprising generating a load scaling factor responsive to at least one of the feeder active powers and the feeder reactive powers.

12. The method of claim 11, further comprising using the load scaling factor to determine load allocation among the feeders.

13. Computer readable medium for determining a power flow in an electrical distribution network, said computer readable medium comprising computer program code that when executed by a processor causes the processor to make a determination of electrical power flow in the electrical distribution network, the computer readable medium when executed by the processor is configured:

to determine respective feeder apparent powers of electrical power feeders connected at a supply node of an electrical distribution network;

to relate the feeder apparent powers with respect to a supply node active power and a supply node reactive power based on the following system of equations:

$$P_{inj} = S_1 \cos \phi_1 + S_2 \cos \phi_2 + S_3 \cos \phi_3 + \ldots + S_n \cos \phi_n$$

$$Q_{inj} = S_1 \sin \phi_1 + S_2 \sin \phi_2 + S_3 \sin \phi_3 + \ldots + S_n \sin \phi_n,$$

wherein n is a positive integer that represents a number of feeders, $\phi_n$ represents a factor angle for an $n^{th}$ feeder, $S_n$ represents apparent power for the $n^{th}$ feeder with respect to injected active power $P_{inj}$ and in injected reactive power $Q_{inj}$;

to determine a feeder power factor angle of at least one of the feeders responsive to the feeder apparent powers, the supply node active power, and the supply node reactive power; and to process at least one of the feeder power factor angles for determining a power flow in the electrical distribution network.

14. The computer readable medium of claim 13, further comprising a computer program code for generating a system of node equations having feeder power factor angles of each of the feeders as variables and relating feeder apparent powers, a supply node active power, and a supply node reactive power.

15. The computer readable medium of claim 14, further comprising a computer program code for solving the system of node equations for at least one of the feeder power factor angles.

16. The computer readable medium of claim 15, further comprising a computer program code for solving the system iteratively.

17. The computer readable medium of claim 13, further comprising a computer program code for calculating at least one of a feeder active power and a feeder reactive power responsive to a corresponding feeder apparent power and a corresponding feeder power factor angle.

18. The computer readable medium of claim 17, further comprising a computer program code for generating a load scaling factor responsive to at least one of the feeder active powers and the feeder reactive powers.

19. The computer readable medium of claim 18, further comprising a computer program code for using the load scaling factor to determine load allocation between the feeders.

* * * * *